United States Patent Office 3,174,977
Patented Mar. 23, 1965

3,174,977
PLASTIC COMPOSITIONS FOR FLOORING
Arnold J. Hoiberg, Montville, and Edward Licata, Passaic, N.J., assignors, by mesne assignments, to The Flintkote Company, a corporation of Massachusetts
No Drawing. Filed Sept. 28, 1959, Ser. No. 842,614
15 Claims. (Cl. 260—31.8)

This invention relates to plastic compositions of the type that may be applied to a floor surface as by troweling or "puddling" the same in a layer of desired thickness.

It is a principal object of the invention to provide plastic flooring compositions capable of producing finished floors having a surface appearance simulating or resembling that of conventional terrazzo type floors.

Another object of the invention is to provide plastic compositions in the form of a rather fluid mixture which can readily be "puddled" or troweled in place and which will rapidly, i.e., within a matter of several hours, become sufficiently set or cured to form a tough flooring in a relatively thin layer, say of the order of ⅛ inch thickness, having physical properties enabling the surface, if desired, to be ground, as with a terrazzo grinder, to bring out the colors and yield the distinctive beauty usually associated with terrazzo type flooring.

Another object of the invention is to provide flooring compositions of the character above set forth, capable of producing finished floorings in a wide variety of color patterns having the appearance of terrazzo floors, and which will be possessed of high resistance to attack by common solvents.

Still another object of the invention is to provide flooring compositions as aforesaid, which may be compounded so that the finished flooring will possess high resistance to attack by common acids or other chemicals.

Stated broadly, the foregoing and other objects and advantages of the invention may be accomplished by combining a binder comprising an epoxy resin of the character hereinafter set forth, suitable platicized and having an appropriate curing agent mixed therewith, with substantial quantities of mineral filler and relatively small chips or pieces of preformed plastic material made of thermoplastic resin, such as a copolymer of vinyl chloride and vinyl acetate, or even a resin of the epoxy type.

As the epoxy resin component of the composition, there may be used those liquid resins containing oxirane oxygen on terminal alkoxy groups only, combined with suitable plasticizers and curing agents.

More specifically, the liquid thermoplastic complex epoxy resins used in the practise of the invention are the di-(epoxy-alkyl) ethers of polyhydric phenols, such as the resins commercially available under the tradename "Epon" and under the tradename "Araldite." These resins contain epoxy and, in some instances also hydroxy, radicals on terminal alkoxy groups, and internal hydroxy groups and ether linkages. They are generally produced by condensation of polyhydric phenols with halo-expoy-alkanes or dichlorohydrins in the presence of alkali; or with polyepoxides. Polyhydric phenols useful in forming the resins are exemplified by the bisphenols, namely, the dihydroxy diphenyl alkanes, hydroquinone, resorcinol and the phenolaldehyde condensates. Suitable halo-epoxyalkanes are epichlorohydrin or 1-chloro-2,3-epoxypropane, 1-chloro-2,3-epoxypentane, and the like. Suitable dichlorohydrins include glycerol dichlorohydrin and similar compounds which convert to the corresponding epoxy compounds in the presence of alkali. Polyepoxy compounds useful in forming epoxy resins are butane dioxide and hexane dioxide.

Resins containing more than one and less than two epoxy groups per molecule are particularly useful for the purposes of the present invention. These are formed by reacting a stoichiometric excess of the epoxy-containing ingredient, as for example, epihalohydrin or polyepoxide, with the polyhydric phenol.

Preferred among the epoxy resins which may be utilized in the practise of the invention are the products formed by reaction of bisphenols with an excess of epichlorohydrin in the presence of an alkali, which are available in liquid state. These expoy resins can be readily blended with liquid plasticizers simply by stirring them together, or with solid plasticizers by mixing them with the plasticizer in a mutual solvent, or by heating and stirring them together.

The expoxy resin preferably employed in the practise of the invention is the resin commercially known in the trade as "Epon 828." This is a viscous, liquid epoxy resin having a melting point of 8 to 12° C., and an expoxide equivalency of about 190 to 210, formed by reaction of 4,4'-dihydroxydiphenyl propane and epichlorohydrin in molar ratio of about 1:2.

The plasticizer for the resin may be either of the non-reactive type, exemplified by polyalkyl esters, such as dibutyl phthalate; or of the reactive type, such as polyamines, depending upon the degree of flexibility and chemical resistance desired in the finished flooring. The plasticizer may be employed in an amount of from 25 to 40 parts with 75 to 60 parts of the resin by weight.

As curing agents for the resin, there may be employed suitable organic amines, such as diethyltriamine, which activate the epoxy and hydroxyl groups thereby enabling these activated groups to link the molecules together. These amine curing agents may be used in an amount of from about 5% to about 15% by weight, of the resin, and permit curing of the epoxy resin at room temperatures.

In addition to the plasticizer and curing agent incorporated with the epoxy resin, there may be added suitable amounts of desired pigment, including titanium oxide, to provide desired intensity of the background color for the flooring, as well as to improve its weathering resistance.

In preparing the binder component for use in the flooring composition of the present invention, the selected epoxy resin may be blended with the selected plasticizer by stirring the two together, aided by heat, if necessary, and then incorporating a suitable quantity of the selected curing agent.

A specifiic example of the binder component of the present flooring composition is as follows:

*Example 1*

| | Lbs. |
|---|---|
| "Epon 828" | 385 |
| Dibutyl phthalate | 135 |
| Diethyl triamine | 38.5 |

As above indicated, desired quantities of suitable pigments may be added to and uniformly dispersed in the fluid mix of resin, plasticizer and curing agent.

In accordance with the invention, the binder component formed as above set forth may be combined with finely-divided solid materials and chips or pieces of plastic composition, to provide a fluid mix capable of being "puddled" or trowelled on a floor. To that end, there is preferably formed a pre-mix, composed of the finely-divided solids and the pieces of chips of plastic stock. The binder component is added to the aforesaid pre-mix and mixed therewith until the finely divided solids and chips are uniformly distributed through the binder component.

A specific example of such a pre-mix, which may be incorporated with the approximately 558 pounds of binder of Example 1, is as follows:

*Example 2*

| | Lbs. |
|---|---|
| Rock dust (passing 200 mesh) | 750 |
| Dolomite (40-100 mesh) | 750 |
| Chips of plastic stock | 1000 |

In the formula of Example 2, the dolomite may be replaced by an equivalent amount of finely-divided siliceous material, particularly where acid resistance is desired in the finished flooring.

The chips of plastic stock may vary in size from such as pass a No. 4 mesh sieve to such as are retained on a 50-mesh sieve, desirably passing 6 mesh and retained on 24 mesh.

Thus, for example, the chips may be of a mesh grading of the order as follows:

| | |
|---|---|
| Percent retained on No. 4 mesh | 3.5 |
| Percent retained on No. 6 mesh | 48.8 |
| Percent retained on No. 12 mesh | 43.5 |
| Percent retained on No. 20 mesh | 2.2 |
| Percent passing No. 20 mesh | 2.0 |

As will be apparent, the size grading is not critical, but will depend primarily upon the appearance desired on the finished flooring. At any rate, as will be seen from the foregoing tabulation, the chips are of a grading such that not less than about 90% thereof (98% in the example given in the tabulation) are retained on a 20-mesh screen.

The chips, as above indicated, may be composed of any suitable plastic stock, such as one made from a pigmented vinyl resin, preferably combined with suitable mineral fiber and filler to toughen the chips and lower their cost. A typical formulation for such a plastic stock is as follows:

| | Range of percent |
|---|---|
| Vinyl resin (Footnote a) | 15–28 |
| Piccoflex Type 115 Resin (Footnote b) | 0–10 |
| Plasticizer (dioctyl phthalate) | 4–7 |
| Stabilizer for vinyl | 0.7–1.0 |
| Asbestos fiber (6 N) | 25–40 |
| Limestone filler | 25–40 |
| Lubricant | 0.05–0.15 | a Copolymer of 13 to 15% vinyl acetate and 87 to 85% vinyl chloride.
b Styrene copolymer resin.

As will be understood, the particular formulation of the plastic stock of which the chips are composed is not critical, and many variations of this are possible. Thus, in lieu of chips of vinyl resin stock there may be employed chips of epoxy resin mastic, especially where good chemical resistance is desired. Obviously, chips of other suitable plastic stocks which will retain their individual integrity in the fluid binder component during mixing, spreading, and curing of the flooring composition, may be employed. Where a finished flooring having high resistance to attack by acids is desired, the asbestos fiber may be omitted, or the asbestos fiber and limestone filler of the above formulation for the chip stock may be replaced by an equivalent amount of finely-divided siliceous material. Where chips made of epoxy resin mastic are employed, the fiber may be omitted.

Depending upon the pigments incorporated in the binder component and upon the color of the chips of plastic stock utilized in forming the flooring composition, a wide variety of color effects having the distinctive beauty of terrazzo type flooring may be achieved. Thus the finished flooring may be made to have any desired background color, through which will be distributed or interspersed chips of plastic stock of any one or more colors, as may be desired in the finished flooring.

It will be evident from the foregoing description that by selecting an epoxy resin of the type indicated, and which is or which may be rendered liquid by blending with suitable plasticizers, the powdered or finely divided filler material and the chips of plastic stock may be readily admixed therewith to provide a composition which is quite fluid. Thus by adding the binder component such as that set forth in Example 1, to a premix such as set forth in Example 2, there results a fluid mixture that can be "puddled" or troweled in place in layers of suitable thickness, which may be as thin as ⅛ of an inch.

A layer of the composition thus applied to a floor surface acquires initial set after a period of about five hours, depending upon the prevailing temperature. The resultant cured layer, even in a thickness as little as ⅛ of an inch, provides a flooring of great toughness, posessing high resistance to wear and weather.

A further and important advantage of the resultant plastic flooring is that its surface may, if desired, be ground as with a terrazo grinder, to bring out the colors of the chips of plastic stock distributed through the background color of the cured epoxy rosin and incorporated filler and pigment. The grading, as well as the choice of fillers utilized in the premix, may also be made to serve as factors for adjusting the skid resistance of the surface of the finished flooring.

What we claim is:

1. A plastic flooring composition comprising an air-cured layer of a mixture of (1) an epoxy resin comprising at least one glycidyl polyether of a polyhydric phenol and containing more than one and less than two epoxy groups per molecule and formed by reaction of a stoichiometric excess of the epoxy-containing ingredient with the polyhdric phenol, (2) finely-divided mineral filler distributed substantially uniformly through said mixture, and (3) chips of resinous plastic stock distributed substantially uniformly through said mixture and retaining their individual integrity therein, said chips being of a mesh grading wherein not less than about 90% of said chips are retained on a 20-mesh screen, said chips being composed of a separately formed mixture consisting essentially of thermoplastic resinous material and mineral filler.

2. A plastic flooring as defined in claim 1, wherein said epoxy resin is a resin formed by reaction of a polyhydric phenol with an epihalohydrin.

3. A plastic flooring as defined in claim 1, wherein said epoxy resin is a resin formed by reaction of a polyhydric phenol with an epihalohydrin and has an epoxide equivalency of about 190 to 210.

4. A plastic flooring as defined in claim 1, wherein said epoxy resin has a melting point of about 8 to 12° C., in its uncured state.

5. A plastic flooring as defined in claim 1, wherein said epoxy resin is plasticized with a material from the group consisting of polyalkyl esters and polyamines.

6. A plastic flooring as defined in claim 1, wherein said mixture of epoxy resin and first-named mineral filler is pigmented to provide a selected background color for the flooring, and wherein said chips are of colors distinguishing from said background color.

7. A plastic flooring as defined in claim 1, wherein said mineral filler is composed of siliceous material whereby to render the flooring resistant to attack by acids.

8. A composition for forming plastic flooring which simulates the appearance of conventional terrazzo flooring, said composition comprising a trowelable mixture of:
(1) a binder composed of:
   (a) plasticized epoxy resin comprising at least one glycidyl polyether of a polyhydric phenol and containing more than one and less than two epoxy groups per molecule and formed by reaction of a stoichiometric excess of the epoxy-containing ingredient with the polyhydric phenol; and
   (b) a curing agent for said resin;
(2) finely-divided mineral filler; and
(3) chips of plastic material composed of a separately formed mixture of:
   (a) a thermoplastic resin; and
   (b) finely divided mineral filler; said finely-divided mineral filler (2) and said chips (3) being substantially uniformly distributed through said binder (1); said chips (3):
     (a) retaining their individual integrity in said composition,
     (b) being of a mesh grading wherein not less than about 90% of said chips are retained on a 20-mesh screen, and
     (c) being of colors distinguishing from that of the mixture of said binder (1) with said finely-divided filler (2).

9. A composition as defined in claim 8, wherein said epoxy resin is a viscous liquid material having a melting point of about 8 to 12° C., and an epoxide equivalency of about 190 to 210, formed by reaction of a bisphenol and a haloepoxyalkane.

10. A composition as defined in claim 8, wherein said mineral fillers are composed of siliceous material.

11. A composition for forming plastic flooring which simulates the appearance of conventional terrazzo flooring, said composition being a trowelable mixture composed of (1) a binder component and (2) a solids premix, said premix comprising, in parts by weight, the following:

| | |
|---|---|
| Rock dust (passing 200 mesh) | 750 |
| Dolomite (40–100 mesh) | 750 |
| Chips of plastic material | 1000 | said chips retaining their individual integrity in said mixture, being of a mesh grading wherein not less than about 90% of said chips are retained on a 20-mesh screen, and being composed of thermoplastic resinous material in admixture with mineral filler; and said binder component comprising in parts by weight, the following:

| | |
|---|---|
| Epoxy resin (reaction product of a bisphenol and epichlorohydrin; M.P., 8 to 12° C., epoxy equivalency 190 to 120) | 385 |
| Dibutyl phthalate | 135 |
| Diethyl triamine | 38.5 |

12. The method of forming a plastic flooring, which comprises making a premix composed of finely-divided mineral filler and chips consisting essentially of a thermoplastic resin and mineral filler, said chips being of a mesh grading wherein not less than about 90% of said chips are retained on a 20-mesh screen, mixing said premix with a binder composed of an epoxy resin comprising at least one glycidyl polyether of a polyhydric phenol and containing more than one and less than two epoxy groups per molecule and formed by reaction of a stoichiometric excess of the epoxy-containing ingredient with the polyhydric phenol, a plasticizer and a curing agent for said epoxy resin, said mixing being continued until said first-named mineral filler and said chips are uniformly distributed through said binder, spreading said mixture in a layer of desired thickness on a floor surface, and allowing said layer to set and cure.

13. The method of claim 12, wherein said mixture of epoxy resin and the mineral filler of said premix is pigmented to provide a selected background color for the flooring, and wherein said chips are of colors distinguishing from said background color.

14. The method of claim 12, wherein said epoxy resin has a melting point of about 8 to 12° C.

15. The method of claim 13, followed by the step of grinding the surface of said layer after it has set and cured.

References Cited in the file of this patent
UNITED STATES PATENTS

| | | |
|---|---|---|
| 2,548,029 | Kurtz et al. | Apr. 10, 1951 |
| 2,706,936 | Willson | Apr. 26, 1955 |
| 2,773,043 | Zukas | Dec. 4, 1956 |
| 2,897,733 | Shuger | Aug. 4, 1959 |
| 2,906,720 | Simpson | Sept. 29, 1959 |
| 2,943,953 | Daniel | July 5, 1960 |
| 2,959,508 | Graham et al. | Nov. 8, 1960 |
| 2,971,933 | Beal | Feb. 14, 1961 |